US012583240B2

(12) United States Patent
Okamoto et al.

(10) Patent No.: US 12,583,240 B2
(45) Date of Patent: Mar. 24, 2026

(54) PRINTER AND CUTTER UNIT OF PRINTER

(71) Applicant: SATO HOLDINGS KABUSHIKI KAISHA, Tokyo (JP)

(72) Inventors: Junichi Okamoto, Minato-ku (JP); Shinichiro Hosono, Minato-ku (JP)

(73) Assignee: SATO CORPORATION, Tokyo (JP)

( * ) Notice: Subject to any disclaimer, the term of this patent is extended or adjusted under 35 U.S.C. 154(b) by 0 days.

(21) Appl. No.: 18/726,574

(22) PCT Filed: Oct. 17, 2022

(86) PCT No.: PCT/JP2022/038646
§ 371 (c)(1),
(2) Date: Jul. 3, 2024

(87) PCT Pub. No.: WO2023/145157
PCT Pub. Date: Aug. 3, 2023

(65) Prior Publication Data

US 2025/0178364 A1 Jun. 5, 2025

(30) Foreign Application Priority Data

Jan. 28, 2022 (JP) ................................ 2022-011890

(51) Int. Cl.
*B41J 11/70* (2006.01)
*B26D 1/08* (2006.01)

(52) U.S. Cl.
CPC ............... *B41J 11/70* (2013.01); *B26D 1/085* (2013.01)

(58) Field of Classification Search
CPC .................................. B41J 11/70; B41J 29/13
See application file for complete search history.

(56) References Cited

U.S. PATENT DOCUMENTS

| | | | |
|---|---|---|---|
| 6,102,596 | A | 8/2000 | Komori et al. |
| 2007/0003354 | A1 | 1/2007 | Tamura et al. |

FOREIGN PATENT DOCUMENTS

| | | | | |
|---|---|---|---|---|
| CN | 202053689 | U | * | 11/2011 |
| JP | S58-125053 | U | | 8/1983 |
| JP | H10-309836 | A | | 11/1998 |
| JP | 2999888 | B2 | * | 1/2000 |
| JP | 3812761 | B2 | * | 8/2006 |
| JP | 2006-335016 | A | | 12/2006 |
| JP | 2012-051112 | A | | 3/2012 |
| JP | 2014-104688 | A | | 6/2014 |
| JP | 5835280 | B2 | * | 12/2015 |
| JP | 6701633 | B2 | * | 5/2020 |

* cited by examiner

*Primary Examiner* — Christle I Marshall
(74) *Attorney, Agent, or Firm* — Foley & Lardner LLP

(57) ABSTRACT

A printer includes a cutter unit attachable to and detachable from a printer body, wherein the cutter unit includes a cutter unit body configured to hold a cutter blade that cuts a print medium, and a cutter unit cover having a discharge port configured to allow the print medium to be discharged therethrough, and pivotally supported by an opening and closing shaft so as to be openable and closable with respect to the cutter unit body.

13 Claims, 10 Drawing Sheets

PRINTER AND CUTTER UNIT OF PRINTER

The present application claims priority under Japanese Patent Application No. 2022-011890 filed to the Japan Patent Office on Jan. 28, 2022, and an entire content of this application is incorporated herein by reference.

TECHNICAL FIELD

The present invention relates to a printer and a cutter unit of the printer.

BACKGROUND ART

JP2006-335016A discloses a printer including a printer body having a printing unit that prints data on a label (a print medium), a cutter unit (a cutter unit body) having a cutter (a cutter blade) that is provided in the printer body and cuts the label in a direction orthogonal to a feed direction, and a cover (a cutter unit cover) that is attached to the printer body so as to cover an outer surface of the cutter unit and has a paper discharge port (a discharge port) for discharging the label on which the data is printed.

SUMMARY OF INVENTION

Some labels are provided with an adhesive for sticking to an adherend. When such a label is cut with a cutter blade, the adhesive may adhere to the cutter blade. For this reason, in order to remove the adhesive adhering to the cutter blade, it is necessary to periodically clean the cutter blade.

In the printer described in JP2006-335016A, the cutter unit body and the cutter unit cover are provided separately. For this reason, it takes time to attach and detach the cutter unit body and the cutter unit cover to and from the printer body during cleaning the cutter blade.

Therefore, the present inventor has proposed that the cutter unit body and the cutter unit cover are integrated into one unit.

However, when the cutter unit body and the cutter unit cover are integrated into one unit, it is difficult to clean a surface of the cutter blade facing the cutter unit cover.

The present invention has been made in view of the above problems, and an object of the present invention is to integrate a cutter unit body and a cutter unit cover into one unit and facilitate cleaning of a cutter blade.

According to one aspect of the present invention, a printer includes a cutter unit attachable to and detachable from a printer body, wherein the cutter unit includes a cutter unit body configured to hold a cutter blade that cuts a print medium, and a cutter unit cover having a discharge port configured to allow the print medium to be discharged therethrough, and pivotally supported by an opening and closing shaft so as to be openable and closable with respect to the cutter unit body.

In the aspect, the cutter unit includes the cutter unit body that holds the cutter blade and the cutter unit cover having the discharge port configured to allow the print medium to be discharged therethrough, and the cutter unit cover is pivotally supported by the opening and closing shaft so as to be openable and closable with respect to the cutter unit body. For this reason, when the cutter unit cover is in an open state, a surface of the cutter blade facing the cutter unit cover can be easily cleaned. Therefore, the cutter unit body and the cutter unit cover can be integrated into one unit, and the cutter blade can be easily cleaned.

DESCRIPTION OF EMBODIMENTS

Hereinafter, a printer 1 according to an embodiment of the present invention will be described with reference to FIGS. 1 to 10.

First, an overall configuration of the printer 1 will be described with reference to FIGS. 1 to 8.

Figure 1:
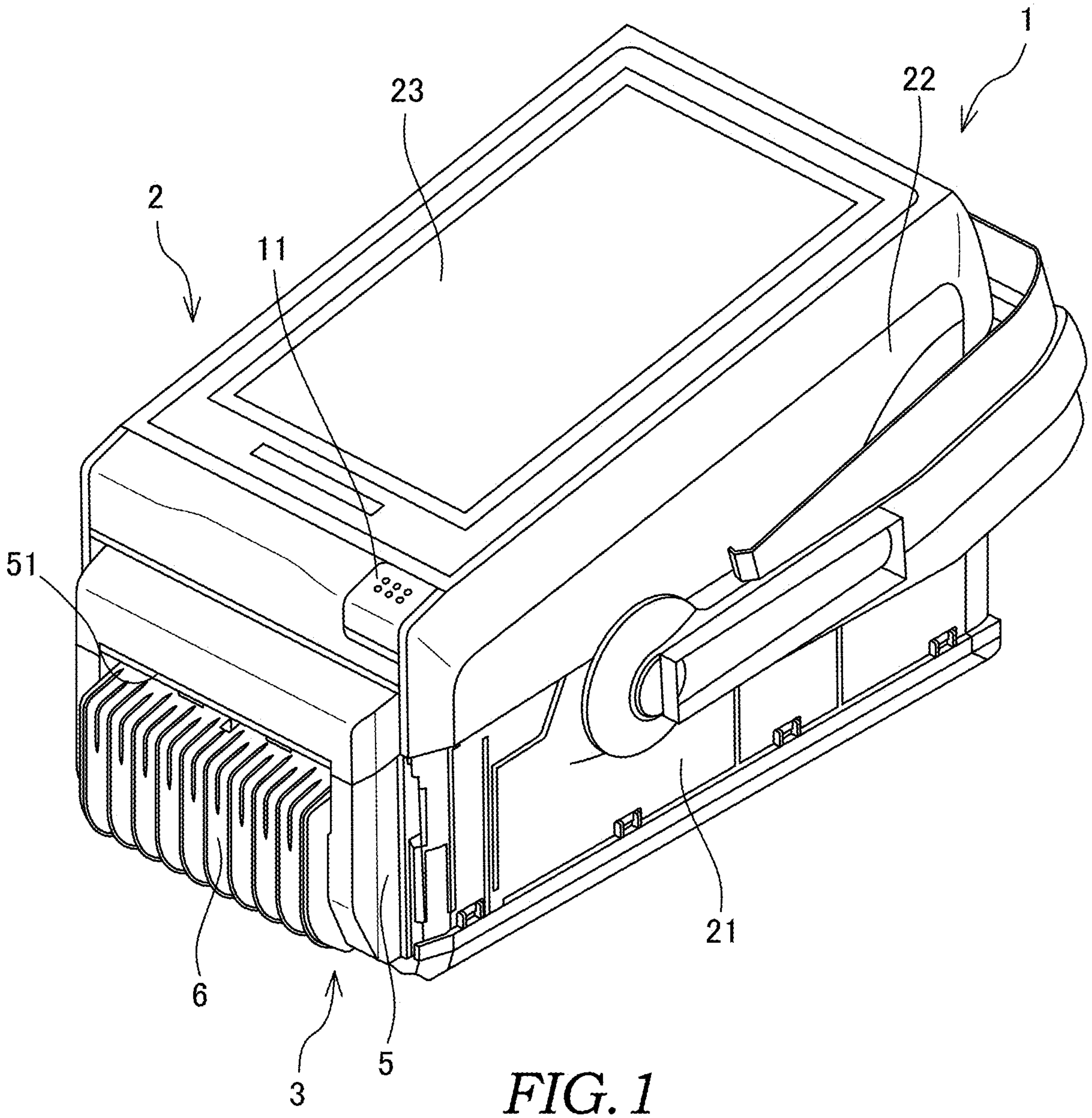
FIG. 1 is a perspective view of a printer according to an embodiment of the present invention.
Figure 2A:
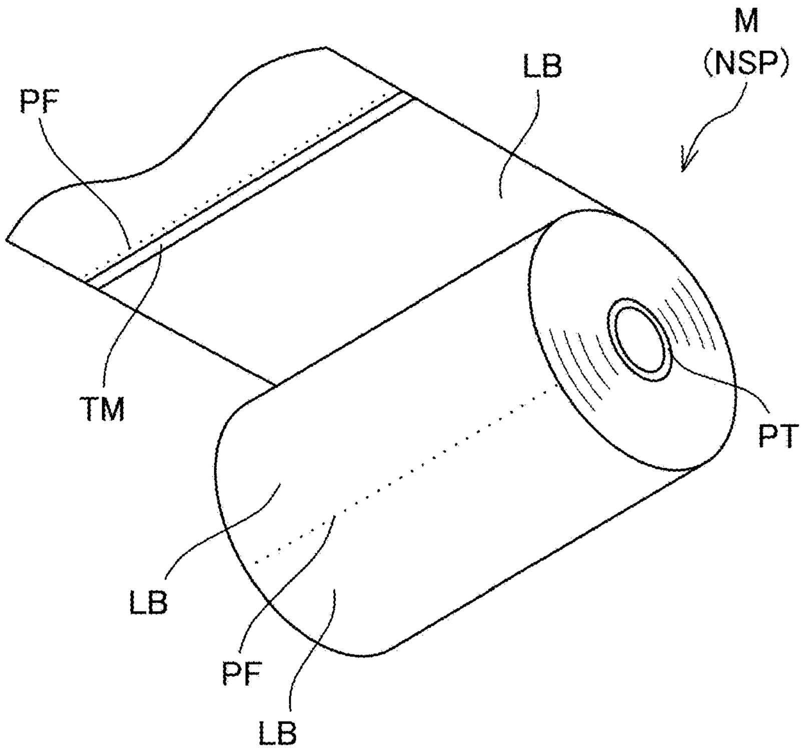
FIG. 2A is a perspective view of an example of a linerless print medium of the printer.
Figure 2B:
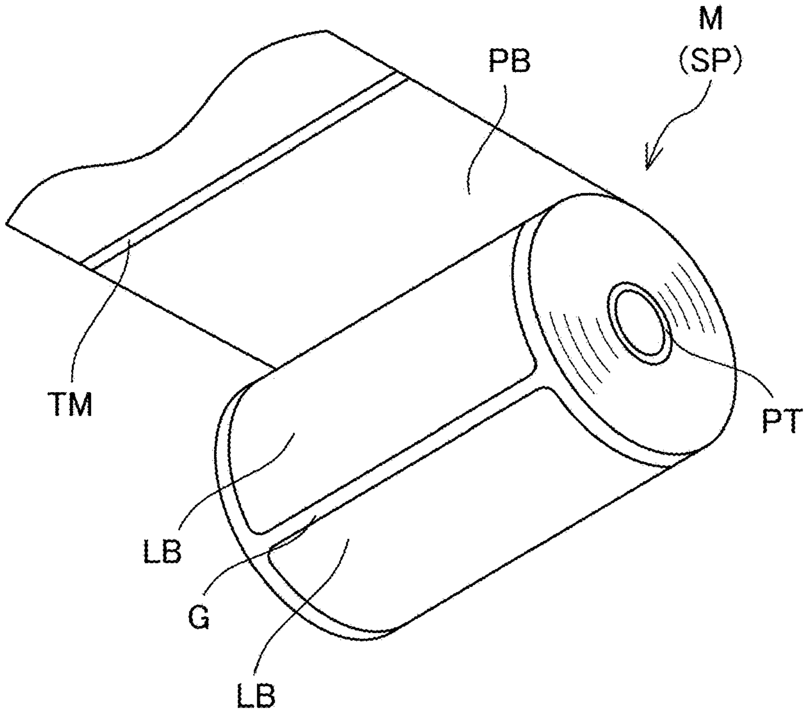
FIG. 2B is a perspective view of an example of the print medium used for continuous issue and peel-off issue of the printer.
Figure 3:
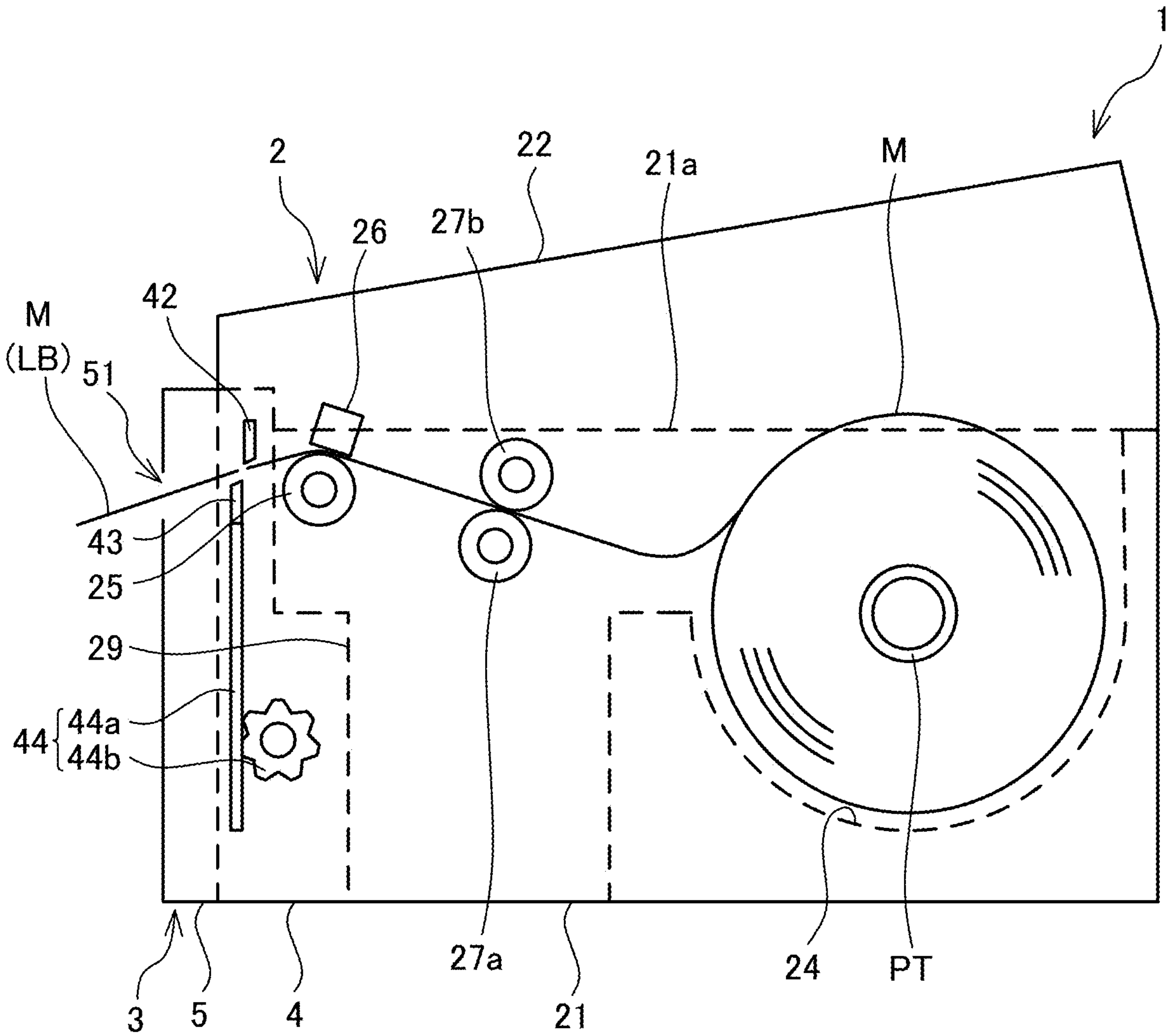
FIG. 3 is a schematic configuration diagram showing a configuration of a main part of the printer.
Figure 4:
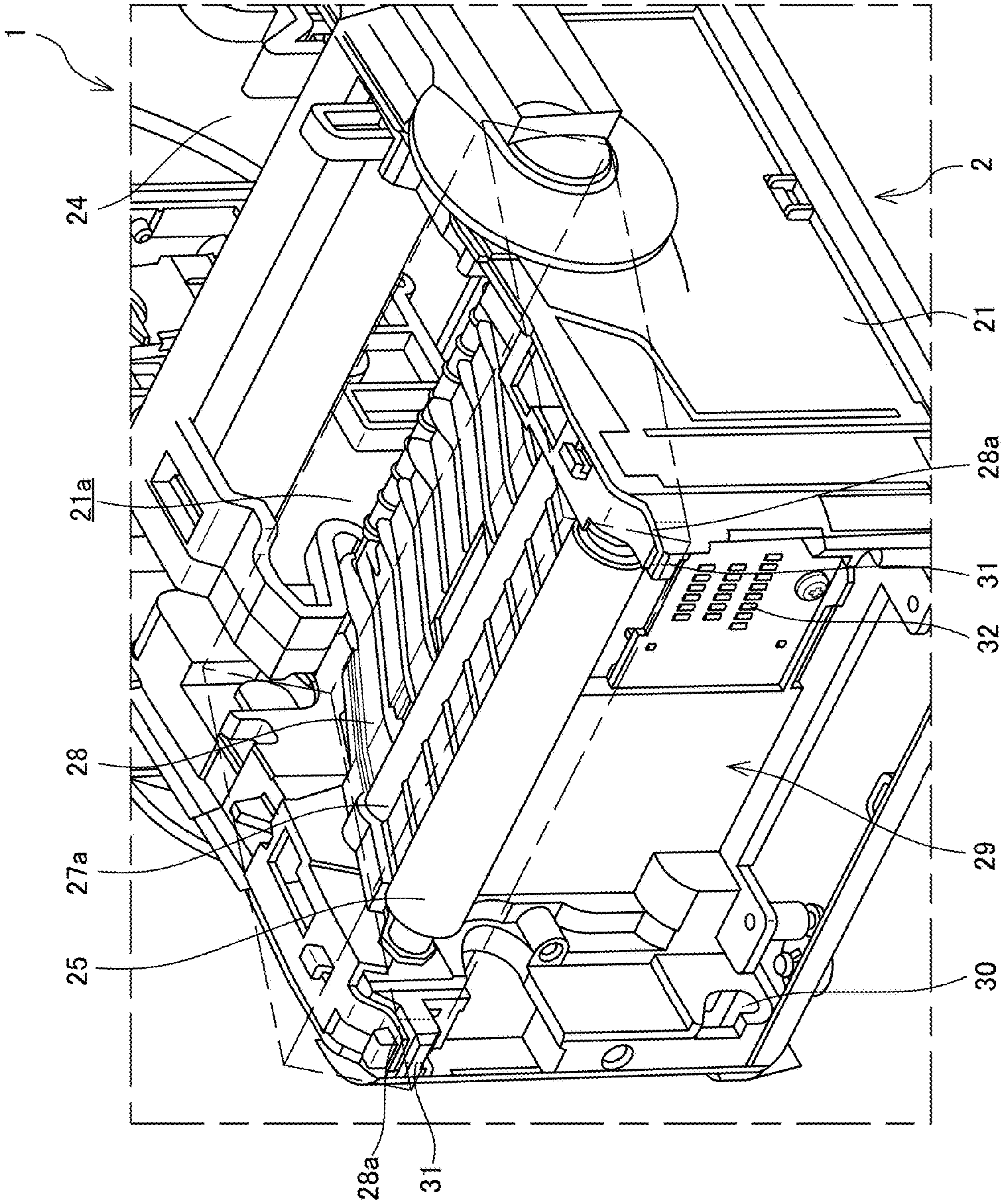
FIG. 4 is a perspective view showing a state in which a cutter unit is detached from the printer.
Figure 5:
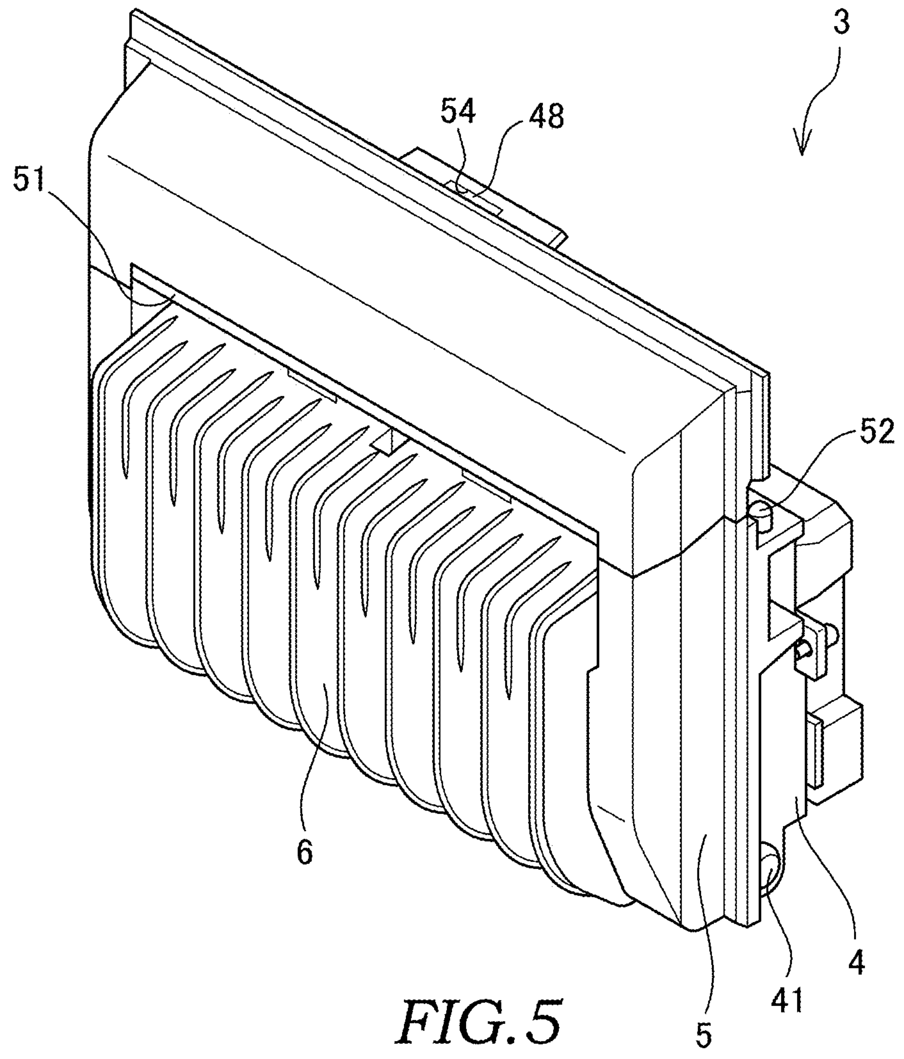
FIG. 5 is a front perspective view of the cutter unit.
Figure 6:
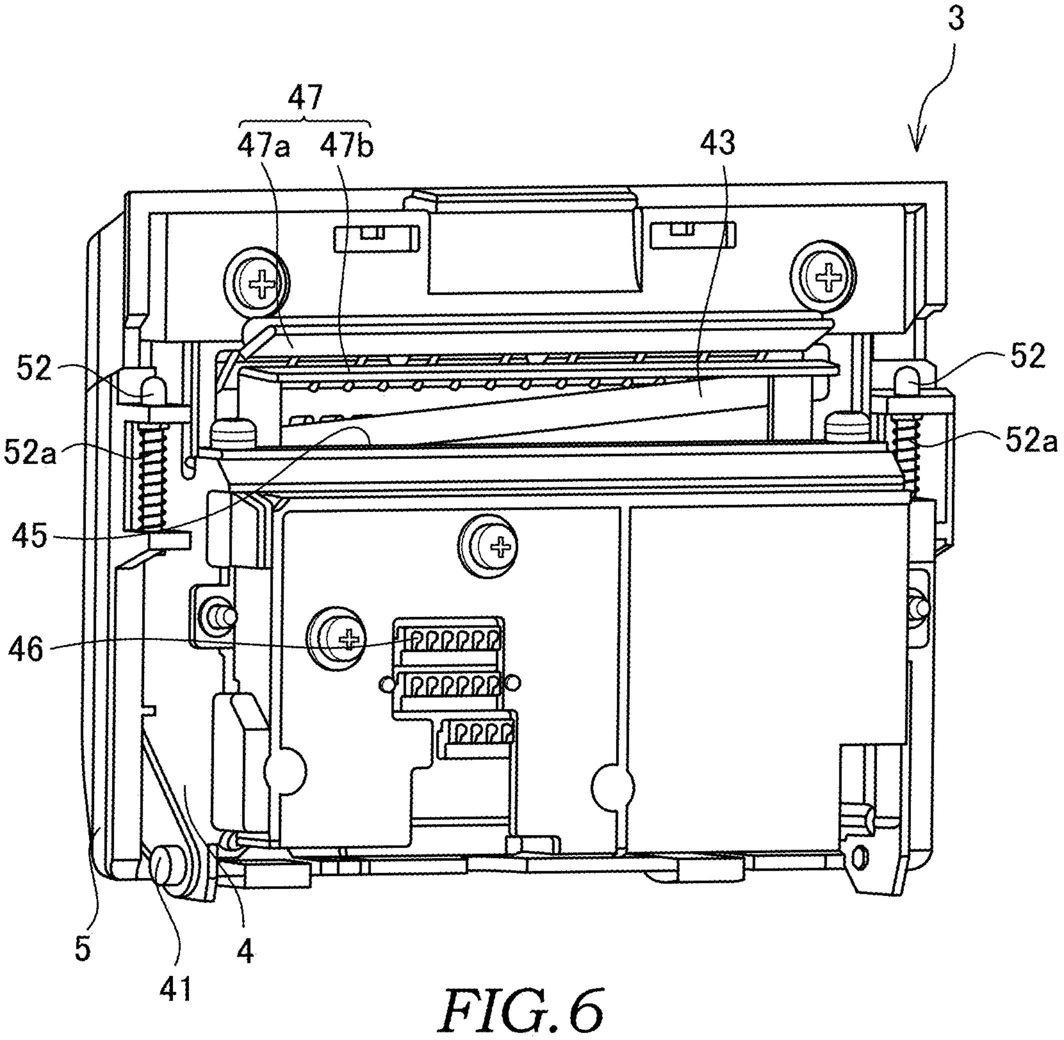
FIG. 6 is a rear perspective view of the cutter unit.
Figure 7:
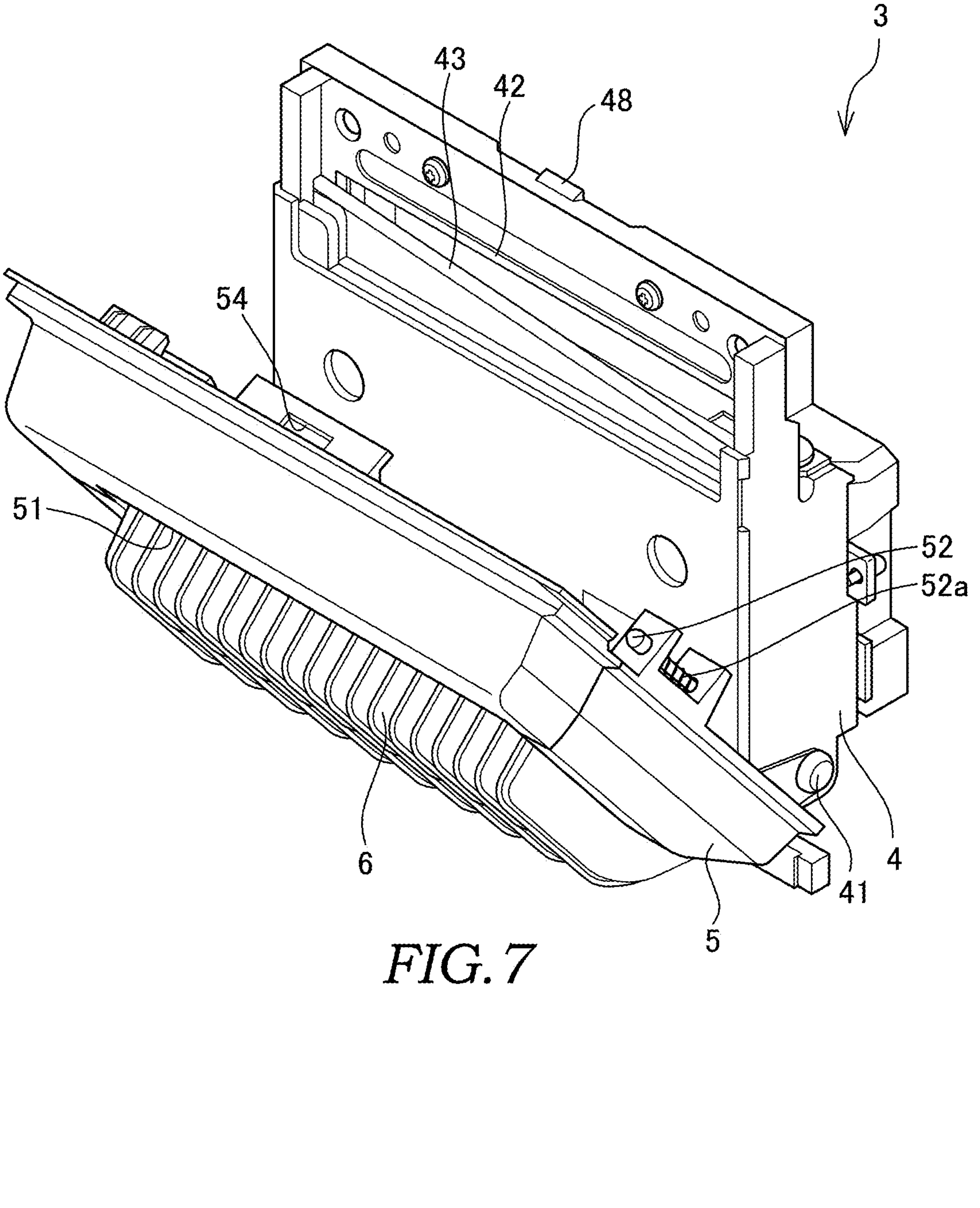
FIG. 7 is a front perspective view showing a state in which the cutter unit shown in FIG. 5 is opened.
Figure 8:
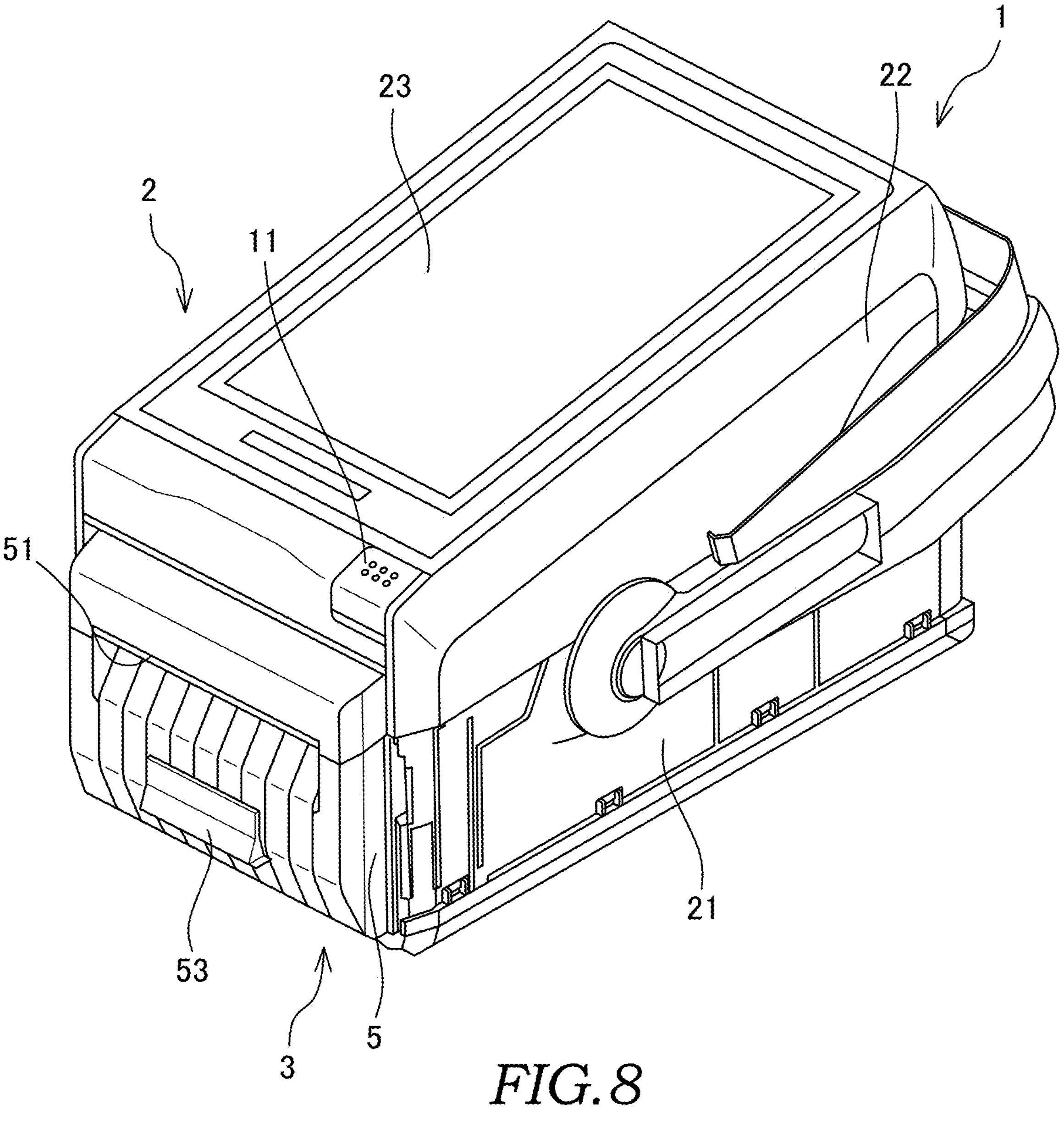
FIG. 8 is a perspective view showing a state in which a protective cover is detached from the printer.

FIG. 1 is a perspective view of the printer 1. FIG. 2A is a perspective view of an example of a linerless print medium M of the printer 1. FIG. 2B is a perspective view of an example of the print medium M used for continuous issue and peel-off issue of the printer 1. FIG. 3 is a schematic configuration diagram showing a configuration of a main part of the printer 1. FIG. 4 is a perspective view showing a state in which a cutter unit 3 is detached from the printer 1. FIG. 5 is a front perspective view of the cutter unit 3. FIG. 6 is a rear perspective view of the cutter unit 3. FIG. 7 is a front perspective view showing a state in which the cutter unit 3 shown in FIG. 5 is opened. FIG. 8 is a perspective view showing a state in which a protective cover 6 is detached from the printer 1.

As shown in FIG. 1, the printer 1 includes a printer body 2 and the cutter unit 3. The printer 1 is a direct thermal printer that performs printing by heating the print medium M (see FIGS. 2A and 2B) that is thermal paper coated with a thermosensitive color developing agent that develops color when a predetermined temperature range is reached. Hereinafter, a direction along a longitudinal direction (a feed direction) of the print medium M to be fed is also referred to as a "front-rear direction", a direction along a width direction of the print medium M is also referred to as a "left-right direction", and a direction along a thickness direction of the print medium M to be fed is also referred to as an "up-down direction".

As shown in FIG. 2A, the print medium M is held by a paper tube PT in a state of being wound in a roll shape. The print medium M is a continuous linerless label NSP. As the print medium M, a continuous label SP having a liner sheet PB may be used.

As shown in FIG. 2A, in the continuous linerless label NSP, a print surface (a front surface) of long thermal paper wound in a roll shape is coated with a release agent such as silicone, and a surface (a back surface) opposite to the print surface is coated with an adhesive for sticking to an adherend. In the continuous linerless label NSP, perforations PF may be formed at predetermined intervals. In this case, each region partitioned by the perforations PF constitutes one label LB. A black strip-shaped timing mark TM used for detecting a position of the label LB is formed on the back surface of the thermal paper.

As shown in FIG. 2B, the continuous label SP includes the long liner sheet PB wound in a roll shape and a plurality of labels LB temporarily attached to a front surface of the liner sheet PB at predetermined intervals. The label LB temporarily attached to the front surface of the liner sheet PB is a thermal label in which a print surface (a front surface) is coated with a thermosensitive color developing agent and a surface (a back surface) opposite to the print surface is coated with an adhesive. In addition, a gap G of about 3 millimeters, which is a region where the liner sheet PB is exposed, is provided between a pair of adjacent labels LB. Further, the black strip-shaped timing mark TM used for detecting a position of the label LB is formed on a back surface of the liner sheet PB. The front surface of the liner sheet PB is coated with a release agent such as silicone to facilitate the peeling of the label LB.

As shown in FIG. 1, FIG. 3, and FIG. 4, the printer body 2 includes a housing 21, a printer cover 22, a touch panel display 23, an accommodation portion 24, a platen roller 25 serving as a feed roller, a thermal head 26, a first auxiliary roller 27*a*, a second auxiliary roller 27*b*, a guide member 28, and a cutter unit attachment portion 29.

As shown in FIG. 1, the housing 21 constitutes an outer shape of the printer body 2. As shown in FIG. 4, the housing 21 is provided with the accommodation portion 24, the first auxiliary roller 27*a*, the platen roller 25, the guide member 28, and the cutter unit attachment portion 29. The housing 21 is provided with a lock mechanism (not shown) for maintaining the printer cover 22 in a closed state. The lock mechanism is released by operating a lever 11 (see FIG. 1) provided on the printer cover 22.

As shown in FIG. 1, the printer cover 22 covers a part of the housing 21. As shown in FIGS. 1 and 3, the printer cover 22 is provided with the touch panel display 23, the thermal head 26, and the second auxiliary roller 27*b*. The printer cover 22 is swingably supported at one end by a support shaft (not shown) provided on the housing 21. The printer cover 22 can be switched between an open state (refer to FIG. 4) in which each component accommodated in an opening 21*a* formed in a part of the housing 21 is opened and a closed state (refer to FIG. 1) in which each component is closed by swinging about the support shaft as a fulcrum.

As shown in FIG. 1, the touch panel display 23 is provided on an outer surface of the printer cover 22. The touch panel display 23 is disposed on an upper surface of the printer cover 22 in the closed state. The touch panel display 23 is configured to display predetermined information. The predetermined information includes information on the printer 1 and an operation key image. When a user touches the operation key image, a processor of the printer 1 receives an instruction corresponding to the operation key image. The touch panel display 23 is, for example, a liquid crystal display having a touch sensor.

As shown in FIG. 3, the accommodation portion 24 is located on the support shaft side of the housing 21. The accommodation portion 24 is configured to accommodate the print medium M. When the printer cover 22 is in the open state, the accommodation portion 24 can be accessed from an outside of the printer 1 through the opening 21*a*. Accordingly, the user can set the print medium M in the accommodation portion 24.

The platen roller 25 is disposed on a surface (an upper surface) of the housing 21 facing the printer cover 22, and is exposed at the opening 21*a*. The platen roller 25 is located downstream of the first auxiliary roller 27*a* in the feed direction of the print medium M. The platen roller 25 is pivotally supported by the housing 21. That is, the platen roller 25 is rotatable with respect to the housing 21. The platen roller 25 is connected to a stepping motor (not shown). The platen roller 25 feeds the print medium M by rotating with respect to the housing 21 under the control of the stepping motor.

The thermal head 26 is disposed on a surface (a lower surface) of the printer cover 22 facing the housing 21. The thermal head 26 is located downstream of the second auxiliary roller 27*b* in the feed direction of the print medium M. The thermal head 26 includes a plurality of heating elements (not shown) that generate Joule heat when energized. The thermal head 26 is connected to a control circuit (not shown). Each heating element generates heat under the control of the control circuit. The thermal head 26 constitutes a printing unit that performs printing on the print medium M together with the platen roller 25 provided on the housing 21 side. The thermal head 26 is separated from the platen roller 25 when the printer cover 22 is in the open state. The thermal head 26 faces the platen roller 25 when the printer cover 22 is in the closed state. The print medium M printed by the thermal head 26 is fed to the cutter unit 3 by the rotation of the platen roller 25.

The first auxiliary roller 27*a* is disposed on the surface (the upper surface) of the housing 21 facing the printer cover 22, and is exposed at the opening 21*a*. The first auxiliary roller 27*a* is located downstream of the accommodation portion 24 in the feed direction of the print medium M. The first auxiliary roller 27*a* is pivotally supported by the housing 21. That is, the first auxiliary roller 27*a* is rotatable with respect to the housing 21.

The second auxiliary roller 27*b* is disposed on the surface (the lower surface) of the printer cover 22 facing the housing 21. The second auxiliary roller 27*b* is located downstream of the accommodation portion 24 in the feed direction of the print medium M. The second auxiliary roller 27*b* is pivotally supported by the printer cover 22. That is, the second auxiliary roller 27*b* is rotatable with respect to the printer cover 22. The second auxiliary roller 27*b* is separated from the first auxiliary roller 27*a* when the printer cover 22 is in the open state. The second auxiliary roller 27*b* faces the first auxiliary roller 27*a* and rotates while nipping the print medium M when the printer cover 22 is in the closed state. The first auxiliary roller 27*a* and the second auxiliary roller 27*b* assist in feeding the print medium M from the accommodation portion 24 to the platen roller 25.

As shown in FIG. 4, the guide member 28 is provided in a feed path of the print medium M including the first auxiliary roller 27*a* and the platen roller 25, and is exposed at the opening 21*a*. The guide member 28 is a substantially flat plate-shaped resin member that guides the print medium M to be fed by the first auxiliary roller 27*a* and the platen roller 25. The guide member 28 includes a pair of protruding ends 28*a*.

The pair of protruding ends 28*a* protrude forward from both ends of the guide member 28 in the left-right direction. Each of the protruding ends 28*a* is provided so as to cover an upper surface of a pin holder 31 to be described later of the housing 21 into which a pin 52 (see FIGS. 5 and 6) of the cutter unit 3 is inserted. Since the protruding end 28*a* is a resin member, the protruding end 28*a* can be elastically deformed by being pressed downward by the user. When the protruding end 28*a* is pressed downward, the protruding end 28*a* presses the pin 52 in an axial direction, and allows the pin 52 to move in a direction of retracting from the pin holder 31. Accordingly, the pin 52 can be detached from the pin holder 31, and the cutter unit 3 can be detached from the cutter unit attachment portion 29.

The cutter unit attachment portion 29 is provided on a front surface of the housing 21. The cutter unit 3 is detachably attached to the cutter unit attachment portion 29. The cutter unit attachment portion 29 includes a shaft support 30 serving as a first support, a pair of pin holders 31 serving as a second support, and a terminal portion 32.

The shaft support 30 supports an opening and closing shaft 41 (see FIGS. 5 and 6) to be described later of the cutter unit 3. A pair of shaft supports 30 are provided to face each other so as to support both ends of the opening and closing shaft 41 extending in the left-right direction of the housing 21. The shaft support 30 is formed to have substantially the same inner diameter as an outer diameter of the opening and closing shaft 41 at a minimum diameter position. The shaft support 30 is formed so as to gradually increase in diameter inward in the left-right direction. This facilitates insertion of the opening and closing shaft 41 into the shaft support 30.

The pin holder 31 holds the pin 52 to be described later (see FIGS. 5 and 6) of the cutter unit 3. The pin holder 31 is a through hole that extends along the up-down direction of the housing 21. The pin holder 31 is formed to have substantially the same inner diameter as an outer diameter of the pin 52. The pair of pin holders 31 are provided at positions separated from each other in the left-right direction. The protruding end 28*a* of the guide member 28 is disposed on an upper surface of the pin holder 31.

The cutter unit 3 is attached to the cutter unit attachment portion 29 in a state in which the shaft support 30 supports the opening and closing shaft 41 and the pin holder 31 holds the pin 52.

The terminal portion 32 includes a plurality of electrodes electrically connected to the cutter unit 3 to transmit and receive electric signals. For example, a signal or the like corresponding to a timing of cutting the print medium M is transmitted from the printer body 2 to the cutter unit 3 through the terminal portion 32.

The cutter unit 3 is detachably attached to the printer body 2. Specifically, the cutter unit 3 is detachably attached to the cutter unit attachment portion 29 of the printer body 2. As shown in FIGS. 5 and 6, the cutter unit 3 includes a cutter unit body 4, a cutter unit cover 5, and the protective cover 6.

Here, the print medium M is provided with an adhesive for sticking to an adherend. When the print medium M is cut by a movable blade 43, the adhesive may adhere to the movable blade 43. For this reason, in order to remove the adhesive adhering to the movable blade 43, it is necessary to periodically clean the movable blade 43. Therefore, in the printer 1, the cutter unit 3 has a structure in which the cutter unit body 4 and the cutter unit cover 5 can be opened and closed. A case where the cutter unit body 4 and the cutter unit cover 5 are in the open state will be described in detail later with reference to FIGS. 9 and 10.

The cutter unit body 4 is formed in a substantially rectangular shape. The cutter unit body 4 includes the opening and closing shaft 41, a fixed blade 42, a movable blade 43 serving as a cutter blade, a cutter drive mechanism 44, an opening 45, a terminal portion 46, and an engagement convex portion 48.

As shown in FIGS. 5 to 7, the opening and closing shaft 41 protrudes outward in the left-right direction from the cutter unit body 4. The opening and closing shaft 41 is formed in a substantially cylindrical shape. Since the opening and closing shaft 41 is supported by the printer body 2, the cutter unit 3 is attached to the printer body 2.

As shown in FIG. 7, the fixed blade 42 is fixed to the cutter unit body 4. A tip of the fixed blade 42 is formed substantially horizontally in the left-right direction.

The movable blade 43 is held by the cutter unit body 4. A tip of the movable blade 43 is formed obliquely so as to be inclined in the left-right direction. The movable blade 43 is movable relative to the fixed blade 42. When the movable blade 43 moves toward the fixed blade 42, the print medium M is cut. After cutting the print medium M between the movable blade 43 and the fixed blade 42, the movable blade 43 retreats in a direction away from the fixed blade 42. The movable blade 43 is driven by the cutter drive mechanism 44.

As shown in FIG. 3, the cutter drive mechanism 44 includes a rack gear 44*a* and a pinion gear 44*b*.

The movable blade 43 is fixed to the rack gear 44*a*. The rack gear 44*a* is provided to be movable in the longitudinal direction. As the rack gear 44*a* moves, the movable blade 43 also moves integrally.

The pinion gear 44*b* is connected to an electric motor (not shown). The pinion gear 44*b* moves the rack gear 44*a* by rotating under the control of the electric motor. A part of the pinion gear 44*b* is exposed to the outside from the cutter unit body 4. Accordingly, when cleaning the movable blade 43, the user manually rotates the pinion gear 44*b* to move the movable blade 43, thereby allowing the movable blade 43 to be largely exposed.

As shown in FIG. 6, the opening 45 is an opening for exposing a part of a surface of the movable blade 43 facing the printer body 2.

The terminal portion 46 includes a plurality of pins that are respectively in contact with the plurality of electrodes of the terminal portion 32 of the printer body 2. The terminal portion 46 is electrically connected to the terminal portion 32 while being in contact therewith. For this reason, the terminal portion 46 is electrically connected to the terminal portion 32 only by attaching the cutter unit 3 to the printer body 2. As described above, the terminal portion 46 is not a harness but a pin that is electrically connected to the terminal portion 32 in a state in which the cutter unit 3 is attached to the printer body 2 and is in contact with the electrodes of the terminal portion 32. Accordingly, in a state in which the cutter unit 3 is detached from the printer body 2, the terminal portion 46 is separated from the terminal portion 32 and power is not supplied to the cutter unit 3, and thus there is no risk of an erroneous operation. However, a configuration in which the cutter unit 3 and the printer body 2 are electrically connected by a harness may be adopted.

A guide plate 47 guides the print medium M when the user sets the print medium M in the cutter unit 3. The guide plate 47 includes a first plate portion 47*a* and a second plate portion 47*b*. The first plate portion 47*a* is provided above the second plate portion 47*b*. The first plate portion 47*a* and the second plate portion 47*b* are provided obliquely such that a distance therebetween increases as the first plate portion 47*a* and the second plate portion 47*b* are separated from the cutter unit body 4. Accordingly, since the distance between the first plate portion 47*a* and the second plate portion 47*b* is the largest at an entrance of the print medium M, the user can easily insert the print medium M.

As shown in FIG. 7, the engagement convex portion 48 protrudes upward from an upper portion of the cutter unit body 4. The engagement convex portion 48 engages with an engagement concave portion 54 of the cutter unit cover 5 when the cutter unit cover 5 is in the closed state.

As shown in FIGS. 5 to 8, the cutter unit cover 5 is formed in a substantially rectangular shape. The cutter unit cover 5 is larger than the cutter unit body 4 and has substantially the same size as the cutter unit attachment portion 29. The cutter unit cover 5 is supported by the opening and closing shaft 41 so as to be openable and closable with respect to the cutter unit body 4. That is, the cutter unit cover 5 is rotatable about the opening and closing shaft 41 with respect to the cutter unit body 4. The cutter unit cover 5 includes a discharge port 51, a pair of pins 52 serving as held portions, a support 53 (see FIG. 8), and the engagement concave portion 54.

The discharge port 51 is a rectangular opening through which a label LB obtained by cutting the print medium M with the fixed blade 42 and the movable blade 43 is discharged. The discharge port 51 has a front surface guide portion 51*a* as a first guide portion and a back surface guide portion 51*b* as a second guide portion (see FIG. 9). The front surface guide portion 51*a* and the back surface guide portion 51*b* will be described in detail later with reference to FIG. 9.

Each of the pins 52 is held on the printer body 2 at a position separated from the opening and closing shaft 41 in a state in which the opening and closing shaft 41 is supported by the printer body 2. The pin 52 is biased by a spring 52*a* serving as a biasing member in a direction (an extension direction) of insertion into the pin holder 31.

When attaching the cutter unit 3 to the printer body 2, the user inserts the opening and closing shaft 41 of the cutter unit 3 into the shaft support 30 of the printer body 2, and then rotates the cutter unit 3 about the opening and closing shaft 41 to insert the cutter unit 3 into the cutter unit attachment portion 29. The cutter unit 3 is pressed against the printer body 2 to insert the pin 52 into the pin holder 31. At this time, the pin 52 is inserted into the pin holder 31 as the compressed spring 52*a* returns to an original state thereof due to restoring force. Accordingly, the cutter unit 3 is attached to the printer body 2.

The opening and closing shaft 41 is supported by the shaft support 30 of the printer body 2 and the pin 52 provided on the cutter unit cover 5 is held by the pin holder 31 of the printer body 2, whereby the cutter unit 3 is attached to the printer body 2. During the operation of the printer 1, the printer cover 22 is in the closed state and the pin 52 cannot be pulled out from the pin holder 31, and thus the cutter unit cover 5 is not opened. That is, the cutter unit cover 5 is not opened when the cutter unit 3 is attached to the printer body 2. Thus, the user cannot touch the cutter unit body 4 while the printer 1 is printing and cutting the print medium M, and thus safety can be improved.

Further, when detaching the cutter unit 3 from the printer body 2, the user presses the protruding end 28*a* of the guide member 28 downward to compress the spring 52*a* and then pulls out the pin 52 from the pin holder 31, and simultaneously rotates the cutter unit 3 about the opening and closing shaft 41 to pull out an upper end of the cutter unit 3 from the cutter unit attachment portion 29. The cutter unit 3 is separated from the cutter unit attachment portion 29 such that the opening and closing shaft 41 is disengaged from the shaft support 30. Accordingly, the cutter unit 3 is detached from the printer body 2.

The support 53 shown in FIG. 8 is covered with the protective cover 6 when not in use (see FIG. 1). The support 53 is accommodated in the protective cover 6 in a folded state. As shown in FIG. 8, the support 53 is exposed to the outside in a state in which the protective cover 6 is detached. When the support 53 is raised from the folded state, the support 53 protrudes toward the front of the printer 1. In a state in which the support 53 is raised, it is possible to prevent the print medium M cut by the cutter unit 3 after being printed from sticking to the printer 1.

As shown in FIG. 7, the engagement concave portion 54 is a rectangular hole that is formed in an upper portion of the cutter unit cover 5 and penetrates the cutter unit cover 5 in the up-down direction. When the cutter unit cover 5 is in the closed state, the engagement convex portion 48 of the cutter unit body 4 is engaged with the engagement concave portion 54.

As shown in FIG. 1, the protective cover 6 is a cover for preventing a finger of the user or the like from being inserted through the discharge port 51. By providing the protective cover 6, the safety is improved.

Next, cleaning of the cutter unit 3 will be described with reference to FIGS. 9 and 10.

Figure 9:
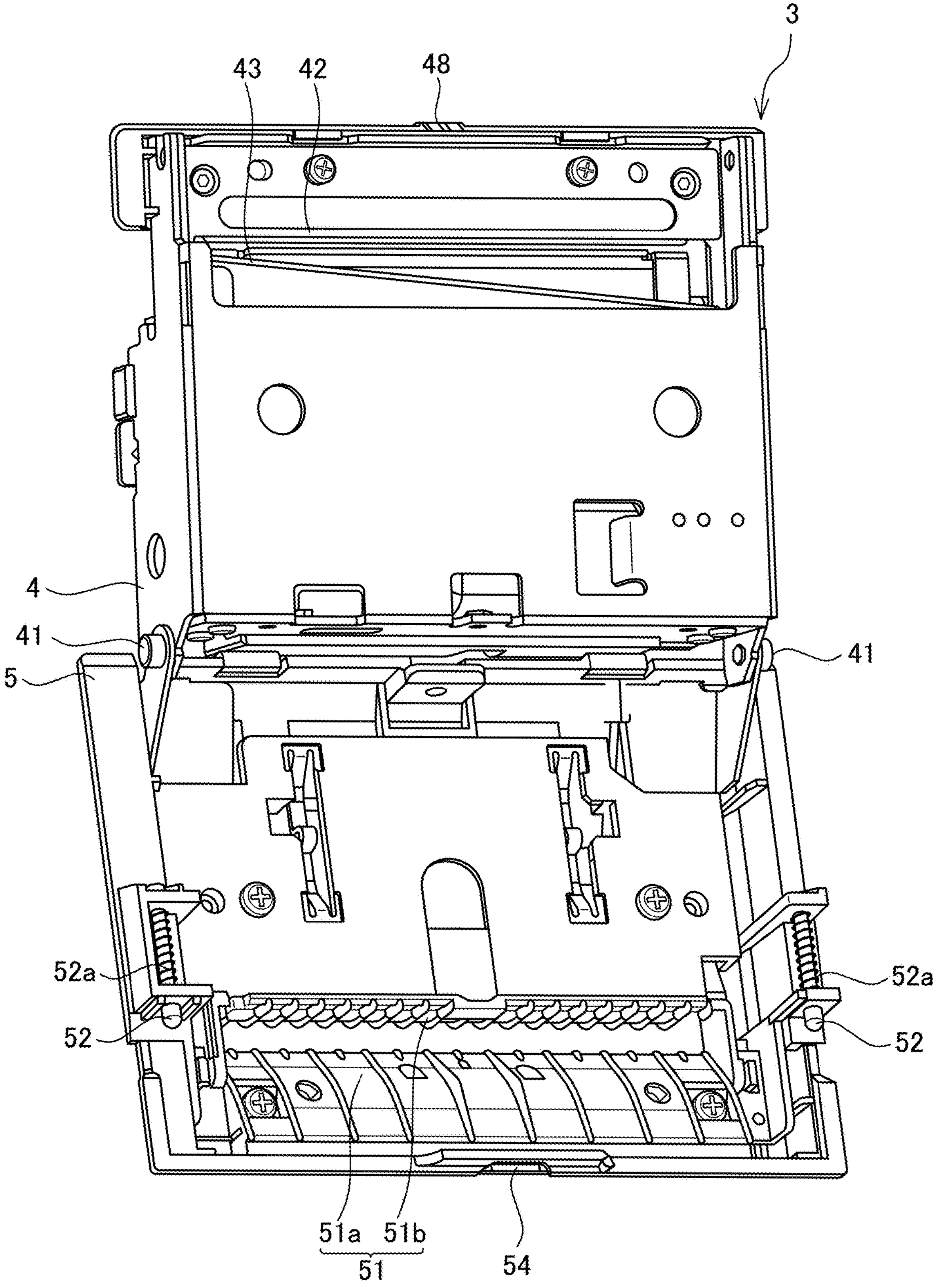
FIG. 9 is a perspective view showing an inner surface of the cutter unit in an open state.

FIG. 9 is a perspective view showing an inner surface of the cutter unit 3 in the open state. FIG. 10 is a perspective view showing an outer surface of the cutter unit 3 in the open state.

Figure 10:
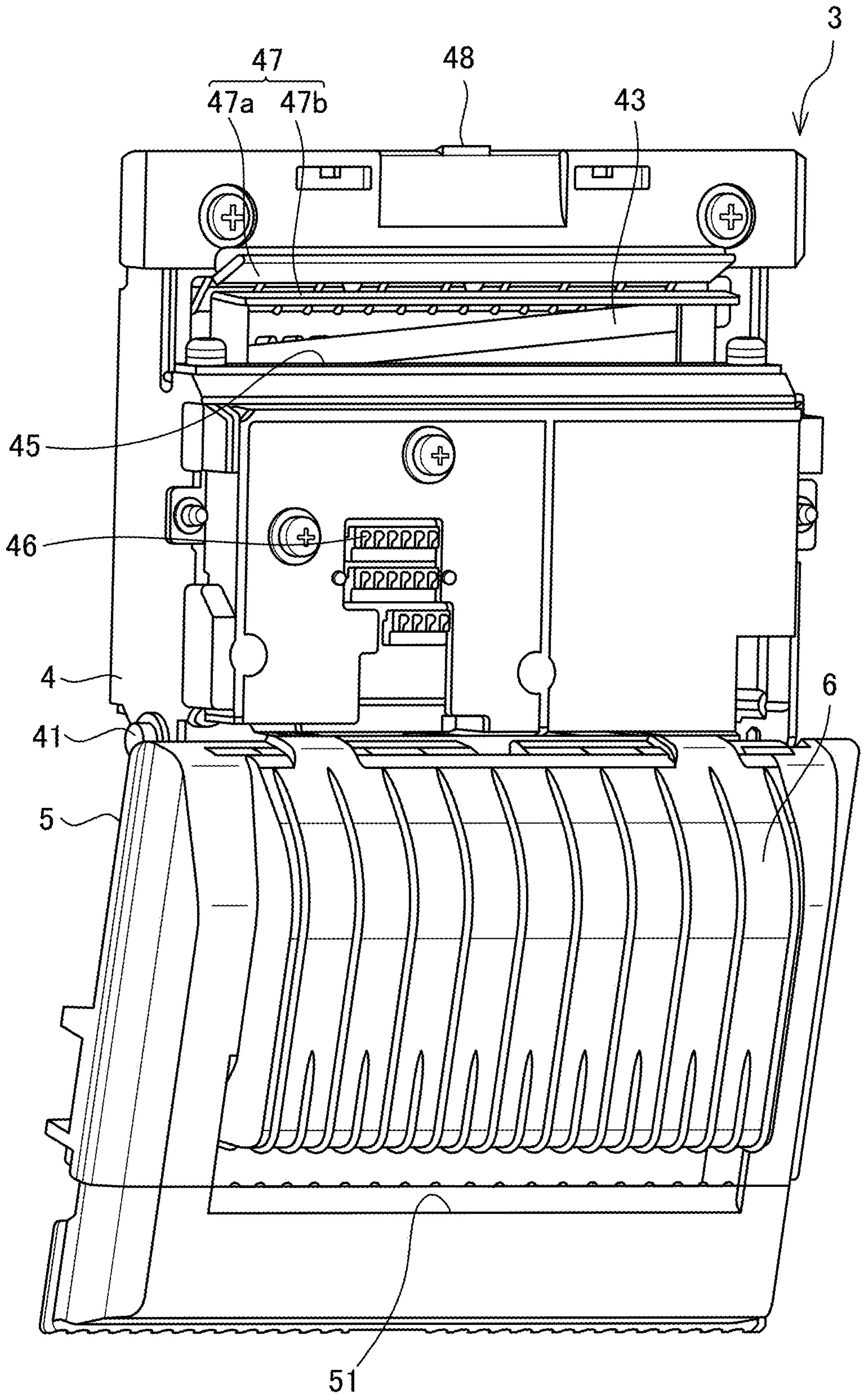
FIG. 10 is a perspective view showing an outer surface of the cutter unit in the open state.

As shown in FIGS. 9 and 10, the cutter unit 3 can be opened to about 180 degrees by rotating the cutter unit cover 5 about the opening and closing shaft 41 with respect to the cutter unit body 4.

As shown in FIG. 9, when the cutter unit cover 5 is in the open state, the front surface guide portion 51*a* and the back surface guide portion 51*b* of the discharge port 51 are completely exposed, and surfaces of the fixed blade 42 and the movable blade 43 facing the cutter unit cover 5 are largely exposed.

The front surface guide portion 51*a* guides the print surface (the front surface) of the print medium M. The front surface guide portion 51*a* is formed in a convex curved surface shape with respect to the print medium M so as to gradually approach the back surface guide portion 51*b* from upstream to downstream in the feed direction of the print medium M. For this reason, it is difficult for the front surface guide portion 51*a* to be seen at a position further back from the discharge port 51, and it is difficult to perform cleaning by inserting a cotton swab or the like into the discharge port 51 from the front side of the cutter unit 3.

The back surface guide portion 51*b* guides the surface (the back surface) opposite to the print surface of the print medium M. The back surface guide portion 51*b* is formed in a planar shape along the feed direction of the print medium M.

The print medium M is provided with an adhesive for sticking to an adherend. When the print medium M repeatedly passes, the adhesive may adhere to the front surface guide portion 51*a* and the back surface guide portion 51*b*. For this reason, in order to remove the adhesive adhering to the front surface guide portion 51*a* and the back surface guide portion 51*b*, it is necessary to periodically clean the front surface guide portion 51*a* and the back surface guide portion 51*b*.

In contrast, in the cutter unit 3, when the cutter unit cover 5 is in the open state, the front surface guide portion 51*a* and the back surface guide portion 51*b* of the discharge port 51 are completely exposed, and thus the front surface guide portion 51*a* and the back surface guide portion 51*b* are easily cleaned.

When the cutter unit cover 5 is in the closed state, even if the cotton swab or the like is inserted through the discharge port 51, only a part of the discharge port 51 can be cleaned. In contrast, when the cutter unit cover 5 is in the open state, the discharge port 51 is exposed more largely than when the cutter unit cover 5 is in the closed state. This facilitates cleaning of the front surface guide portion 51*a* and the back surface guide portion 51*b*.

When the cutter unit cover 5 is in the closed state, a part of the movable blade 43 is seen from the discharge port 51. However, even if the cotton swab or the like is inserted from the discharge port 51, only a part of the movable blade 43 can be cleaned. In contrast, when the cutter unit cover 5 is in the open state, the surface of the movable blade 43 facing the cutter unit cover 5 is exposed more largely than when the cutter unit cover 5 is in the closed state. Accordingly, cleaning of the surface of the movable blade 43 facing the cutter unit cover 5 is facilitated, and a cleanable region of the movable blade 43 is increased.

As described above, the cutter unit 3 includes the cutter unit body 4 that holds the movable blade 43 and the cutter unit cover 5 having the discharge port 51 configured to allow the print medium M to be discharged therethrough, and the cutter unit cover 5 is pivotally supported by the opening and closing shaft 41 so as to be openable and closable with respect to the cutter unit body 4. For this reason, when the cutter unit cover 5 is in the open state, the surface of the movable blade 43 facing the cutter unit cover 5 can be easily cleaned. Therefore, the cutter unit body 4 and the cutter unit cover 5 can be integrated into one unit, and the movable blade 43 can be easily cleaned.

In the printer 1, it is not necessary to use a tool when the cutter unit is detached from the cutter unit attachment portion 29 of the printer body 2 and when the cutter unit cover 5 is in the open state, and thus workability is good.

As shown in FIG. 10, the cutter unit body 4 has the opening 45 through which a part of a surface of the movable blade 43 facing the printer body 2 is exposed. For this reason, a part of the movable blade 43 exposed from the opening 45 can be cleaned. Accordingly, not only the surface of the movable blade 43 facing the cutter unit cover 5 but also the surface of the movable blade 43 facing the printer body 2 can be easily cleaned, and the cleanable region of the movable blade 43 increases.

According to the above embodiment, the following effects are achieved.

The printer 1 includes the cutter unit 3 that is attachable to and detachable from the printer body 2, and the cutter unit 3 includes the cutter unit body 4 that holds the movable blade 43 that cuts the print medium M, and the cutter unit cover 5 that has the discharge port 51 through which the print medium M is discharged and is pivotally supported by the opening and closing shaft 41 so as to be openable and closable with respect to the cutter unit body 4.

In the configuration, the cutter unit 3 includes the cutter unit body 4 that holds the movable blade 43 and the cutter unit cover 5 having the discharge port 51 through which the print medium M is discharged, and the cutter unit cover 5 is pivotally supported by the opening and closing shaft 41 so as to be openable and closable with respect to the cutter unit body 4. For this reason, when the cutter unit cover 5 is in the open state, the surface of the movable blade 43 facing the cutter unit cover 5 can be easily cleaned. Therefore, the cutter unit body 4 and the cutter unit cover 5 can be integrated into one unit, and the movable blade 43 can be easily cleaned.

Although the embodiments of the present invention have been described above, the above-mentioned embodiments are merely a part of application examples of the present invention, and do not mean that the technical scope of the present invention is limited to the specific configurations of the above-mentioned embodiments.

In the above embodiment, the case where the print medium M has the adhesive and the adhesive adhering to the cutter unit 3 is cleaned has been described, but the print medium M may not have the adhesive. In this case, by making the cutter unit 3 openable and closable, it is possible to easily clean chips or the like generated when the print medium M is cut by the cutter unit 3.

The invention claimed is:

1. A printer comprising:

a cutter unit attachable to and detachable from a printer body, wherein the cutter unit comprises:
- a cutter unit body configured to hold a cutter blade that is configured to cut a print medium, the cutter unit body comprising:
  - a first plate portion and a second plate portion, together defining an insertion opening through which the print medium is insertable, and
  - a cutter unit body opening extending through the cutter unit body, wherein the cutter unit body opening is distinct from the insertion opening, and a part of a surface of the cutter blade facing the printer body is exposed through the cutter unit body opening, and
- a cutter unit cover having a discharge port configured to allow the print medium to be discharged therethrough, and pivotally supported by an opening and closing shaft so as to be openable and closable with respect to the cutter unit body.

2. The printer according to claim 1, wherein:

when the cutter unit cover is in an open state, more of a surface of the cutter blade facing the cutter unit cover is exposed than when the cutter unit cover is in a closed state.

3. The printer according to claim 1, wherein:

when the cutter unit cover is in the open state, more of the discharge port is exposed more than when the cutter unit cover is in the closed state.

4. The printer according to claim 1, wherein:

the discharge port comprises a first guide portion configured to guide a print surface of the print medium and a second guide portion configured to guide a surface opposite to the print surface of the print medium.

5. The printer according to claim 1, wherein:

the cutter unit is attached to the printer body by the opening and closing shaft being supported by the printer body.

6. The printer according to claim 5, wherein:

the cutter unit cover comprises a held portion configured to hold the cutter unit cover on the printer body at a position separated from the opening and closing shaft in a state in which the opening and closing shaft is supported by the printer body.

7. The printer according to claim 1, wherein:

the cutter unit cover is not in an open state in a state in which the cutter unit is attached to the printer body.

8. The printer according to claim 1, wherein:

the cutter unit body comprises a terminal portion electrically connected in a state of being in contact with an electrode of the printer body when the cutter unit body is attached to the printer body.

9. The printer according to claim 1, wherein:

the cutter unit body opening is larger than the insertion opening.

10. A cutter unit for a printer, the cutter unit being attachable to and detachable from a printer body, and comprising:

a cutter unit body configured to hold a cutter blade that is configured to cut a print medium, the cutter unit body comprising:

a first plate portion and a second plate portion, together defining an insertion opening through which the print medium is insertable, and a cutter unit body opening extending through the cutter unit body, wherein the cutter unit body opening is distinct from the insertion opening, and a part of a surface of the cutter blade facing the printer body is exposed through the cutter unit body opening; and a cutter unit cover having a discharge port configured to allow the print medium to be discharged therethrough, and pivotally supported by an opening and closing shaft so as to be openable and closable with respect to the cutter unit body.

11. The cutter unit according to claim 10, wherein:

the cutter unit body opening is larger than the insertion opening.

12. The printer according to claim 11, wherein:

the cutter unit cover comprises a held portion configured to hold the cutter unit cover on the printer body at a position separated from the opening and closing shaft in a state in which the opening and closing shaft is supported by the printer body.

13. A printer comprising:

a cutter unit attachable to and detachable from a printer body, wherein the cutter unit comprises:

a cutter unit body configured to hold a cutter blade that is configured to cut a print medium, and a cutter unit cover having a discharge port configured to allow the print medium to be discharged therethrough, and pivotally supported by an opening and closing shaft so as to be openable and closable with respect to the cutter unit body; wherein:

the cutter unit is attached to the printer body by the opening and closing shaft being supported by the printer body.

* * * * *